(12) United States Patent
Shintani (10) Patent No.: US 8,917,428 B2
(45) Date of Patent: Dec. 23, 2014

(54) IMAGE READING CONTROLLER AND IMAGE READING APPARATUS

(71) Applicant: Fuji Xerox Co., Ltd., Tokyo (JP)

(72) Inventor: Kazuaki Shintani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/684,384

(22) Filed: Nov. 23, 2012

(65) Prior Publication Data

US 2013/0286447 A1    Oct. 31, 2013

(30) Foreign Application Priority Data

Apr. 27, 2012  (JP) ................................. 2012-103087

(51) Int. Cl.

| H04N 1/04 | (2006.01) |
|---|---|
| H04N 1/38 | (2006.01) |
| H04N 1/40 | (2006.01) |
| H04B 10/12 | (2006.01) |
| H04B 10/00 | (2013.01) |
| G06K 9/22 | (2006.01) |

(52) U.S. Cl.
CPC ................................. *H04N 1/40056* (2013.01)
USPC ........... 358/475; 358/464; 358/447; 398/141; 398/129; 382/313

(58) Field of Classification Search
USPC ................... 358/475, 464; 600/178; 345/206; 398/141, 129; 382/313
See application file for complete search history.

(56) References Cited

U.S. PATENT DOCUMENTS

| 6,178,274 B1 | 1/2001 | Youda et al. |
| 6,349,155 B1 | 2/2002 | Youda et al. |
| 2010/0119236 A1 * | 5/2010 | Uno et al. ..................... 398/141 |
| 2010/0321721 A1 * | 12/2010 | Konishi ....................... 358/1.15 |

FOREIGN PATENT DOCUMENTS

| JP | A-10-013613 | 1/1998 |
| JP | A-10-112771 | 4/1998 |

* cited by examiner

*Primary Examiner* — Charlotte M Baker
*Assistant Examiner* — Rury Grisham
(74) *Attorney, Agent, or Firm* — Oliff PLC (57) ABSTRACT

Disclosed is an image reading controller including an output unit that outputs plural control signals for controlling turning on and off of a light emitting unit of an image reading unit including the light emitting unit and a light receiving unit on respective transmission paths, the plural control signals satisfying at least one of a first condition that respective transmission paths are separated from each other by a predetermined distance or more and a second condition that types of the respective transmission paths are different from each other; and a controller that controls turning on and off of the light emitting unit on the basis of the plural control signals output from the output unit and input through the respective transmission paths.

8 Claims, 5 Drawing Sheets

FIG. 1

FIG. 4

IMAGE READING CONTROLLER AND IMAGE READING APPARATUS

CROSS-REFERENCE TO RELATED APPLICATIONS

This application is based on and claims priority under 35 USC 119 from Japanese Patent Application No. 2012-103087 filed Apr. 27, 2012.

BACKGROUND

Technical Field

The present invention relates to an image reading controller and an image reading apparatus.

SUMMARY

According to an aspect of the invention, there is provided an image reading controller including: an output unit that outputs plural control signals for controlling turning on and off of a light emitting unit of an image reading unit including the light emitting unit and a light receiving unit on respective transmission paths, the plural control signals satisfying at least one of a first condition that respective transmission paths are separated from each other by a predetermined distance or more and a second condition that types of the respective transmission paths are different from each other; and a controller that controls turning on and off of the light emitting unit on the basis of the plural control signals output from the output unit and input through the respective transmission paths.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the accompanying drawings.

First Exemplary Embodiment

Figure 1:
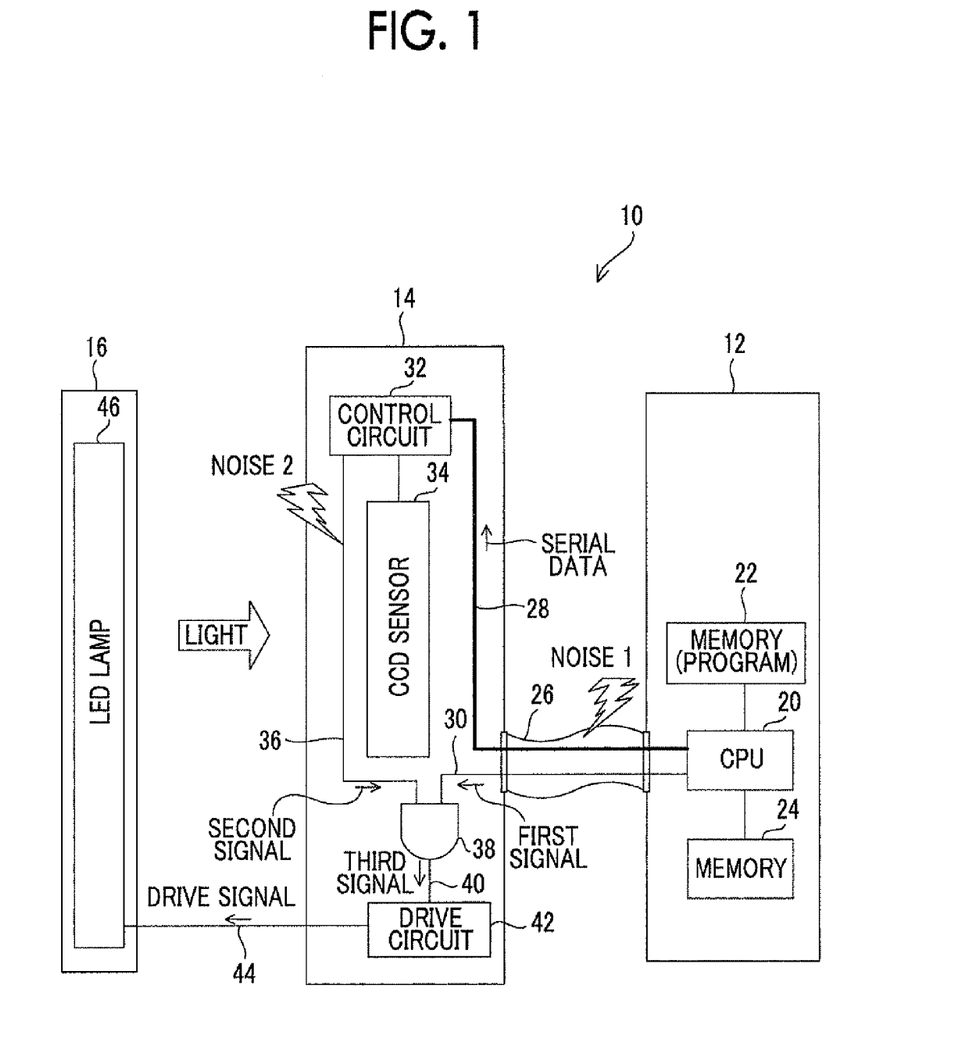
FIG. 1 is a diagram illustrating a configuration example of an image reading apparatus according to a first exemplary embodiment.
Figure 2A:
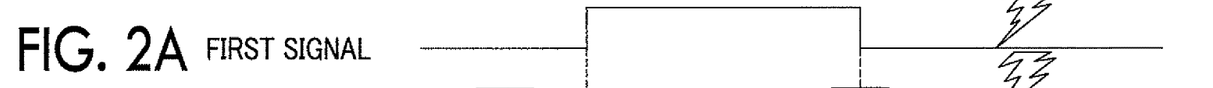
FIGS. 2A to 2E are diagrams illustrating an example of timing charts of respective signals according to the first exemplary embodiment.
Figures 2B, 2C, 2D:
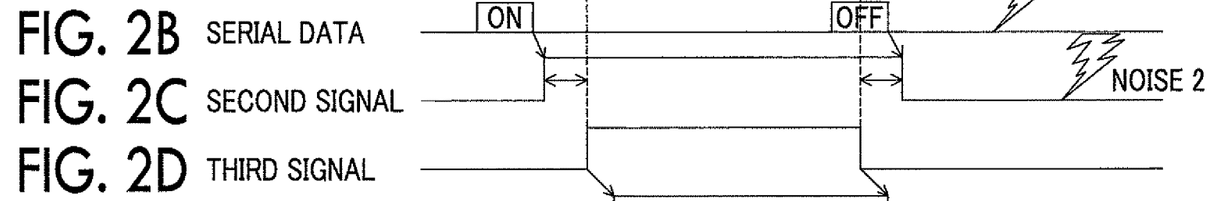
Figure 2E:
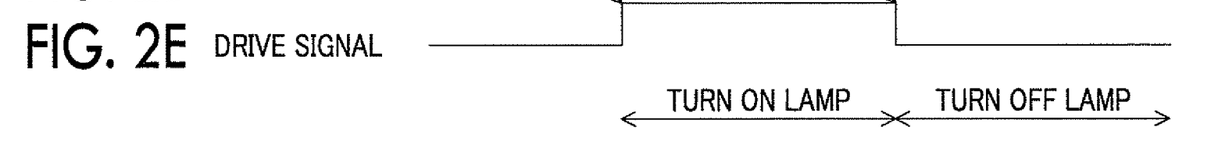
Figure 3A:
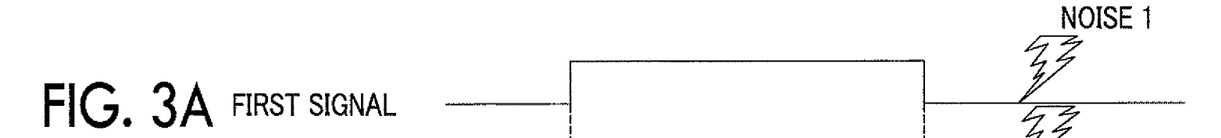
FIGS. 3A to 3E are diagrams illustrating another example of timing charts of respective signals according to the first exemplary embodiment.
Figure 3B:
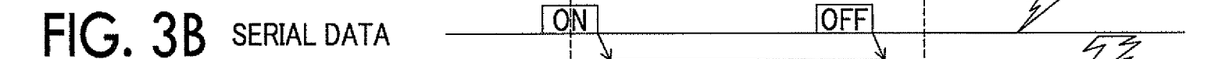
Figures 3C, 3D:
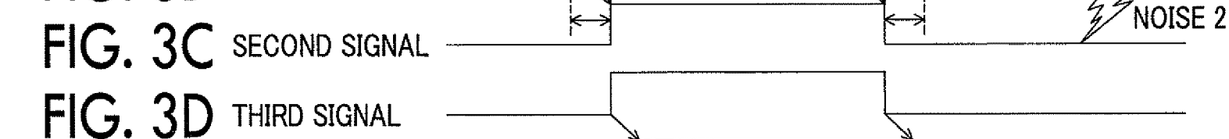
Figure 3E:
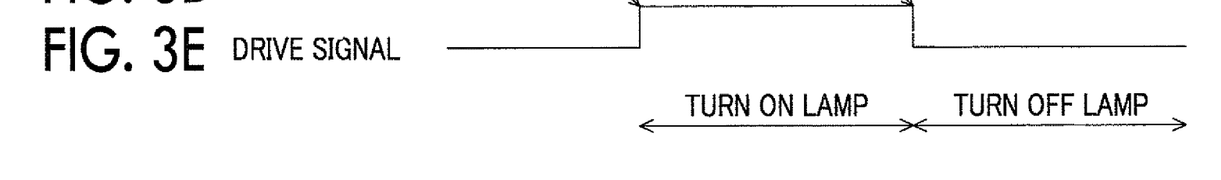

FIG. 1 is a diagram illustrating a configuration example of an image reading apparatus 10 according to a first exemplary embodiment. The image reading apparatus 10 emits light to a document by a light emitting unit, and receives the reflected light with a light receiving unit to read an image of the document. Here, a configuration in which light from the light emitting unit passes through a document, and the light that passed through is received to read an image of the document may be employed.

The image reading apparatus 10 includes a control substrate 12, an image reading substrate 14, and a light emitting substrate 16. The control substrate 12 includes a CPU (Central Processing Unit) 20, a non-volatile memory 22 and a memory 24. These components are connected to each other through a bus (not shown).

The CPU 20 executes a program stored in the memory 22, and controls an overall operation of the image reading apparatus 10. The program executed by the CPU 20, data necessary for processing of the CPU 20, and the like are stored in the memory 22. The memory 24 is used as a work memory or the like. The memory 22 for storing the program executed by the CPU 20 may be a HDD (hard disk drive), a flexible disk or a DVD disc, a magneto-optical disc, a USB (Universal Serial Bus) memory or the like, or may be a storage medium of a different apparatus connected through a communication IF (not shown).

The control substrate 12 is connected to the image reading substrate 14 through a cable 26. The cable 26 includes a part of a reading control signal line 28 that transmits serial data and a part of a first signal line 30 that transmits a first signal. The first signal line 30 includes a single signal line. On the other hand, the reading control signal line 28 is configured by assembling plural signal lines for transmitting data or a clock in a serial manner. The serial data is transmitted through the reading control signal line 28 by a well-known communication protocol (for example, serial connection interface). The serial data is data obtained by successively arranging information formed of plural bits in the unit of one bit.

Each of the reading control signal line 28 and the first signal line 30 is in practice divided into a wiring portion in the control substrate 12, a wiring portion in the cable 26 and a wiring portion in the image reading substrate 14. However, in each of the reading control signal line 28 and the first signal line 30, since the respective wiring portions are connected to each other through connectors of the cable 26 to form a continuous transmission path, the respective wiring portions are herein simply referred to as the reading control signal line 28 and the first signal line 30, without distinction.

The CPU 20 executes the program stored in the memory 22, generates a first signal for controlling the turning on and off of an LED (light emitting diode) lamp 46 that is an example of the light emitting unit provided in the light emitting substrate 16, and outputs the result through the first signal line 30. In the present exemplary embodiment, in a case where the LED lamp 46 is turned on, the CPU 20 outputs the first signal at a high level, and in a case where the LED lamp 46 is turned off, the CPU 20 outputs the first signal at a low level.

Further, the CPU 20 generates serial data (hereinafter, referred to as first serial data) for driving control, gain and magnification adjustment or the like of a CCD (Charge Coupled Device) sensor 34 that is an example of the light receiving unit provided in the image reading substrate 14, and outputs the result through the reading control signal line 28.

Further, the CPU 20 generates serial data (hereinafter, referred to as second serial data for distinction from the first serial data) for controlling turning on and off of the LED lamp 46 in addition to the first signal, and outputs the result through the reading control signal line 28.

A control circuit 32, a CCD sensor 34, an AND circuit 38 and a drive circuit 42 are provided in the image reading substrate 14. The CCD sensor 34 is a device that occupies a large area, and is generally disposed approximately at the center of the image reading substrate 14. Thus, the control circuit 32 or the drive circuit 42 is disposed around the CCD sensor 34 that is disposed at the center. Accordingly, as shown in FIG. 1, the control circuit 32 and the drive circuit 42 are disposed at separated positions in the image reading substrate 14.

The control circuit 32 is connected to an end part of the reading control signal line 28, and the serial data output from the CPU 20 is transmitted through the reading control signal line 28 and is input to the control circuit 32. Further, the control circuit 32 is connected to the AND circuit 38 through a second signal line 36 configured by a single signal line. In a case where the first serial data is input from the CPU 20 through the reading control signal line 28, the control circuit 32 controls the CCD sensor 34 according to the input first serial data. Further, in a case where the second serial data is input from the CPU 20 through the reading control signal line 28, the control circuit 32 generates a second signal for turning on and off the LED lamp 46 according to the second serial data, and transmits the second signal to the AND circuit 38 through the second signal line 36.

More specifically, in a case where the second serial data for instruction of turning on of the LED lamp 46 is input, the control circuit 32 generates the second signal for instruction of turning on of the LED lamp 46 (the second signal is set to a high level) for output, and maintains the high level of the second signal until the second serial data for instruction of turning off of the LED lamp 46 is input. Further, in a case where the second serial data for instruction of turning off of the LED lamp 46, the control circuit 32 generates the second signal for instruction of turning off of the LED lamp 46 (the second signal is set to a low level) for output, and maintains the low level of the second signal until the second serial data for instruction of turning on of the LED lamp 46 is input.

The first signal is input through the first signal line 30 and the second signal is input through the second signal line 36, to the AND circuit 38. The AND circuit 38 outputs a logical product of the input first signal and second signal. Specifically, in a case where both of the input first signal and second signal are at the high level, the AND circuit 38 outputs a third signal of a high level that turns on the LED lamp 46. In a case where at least one of the input first signal and second signal is at the low level, the AND circuit 38 outputs the third signal of a low level that turns off the LED lamp 46.

The third signal is input to the drive circuit 42 through a third signal line 40. In a case where the input third signal is at the high level, the drive circuit 42 generates a drive signal for turning on the LED lamp 46 provided in the light emitting substrate 16, and outputs the result to the light emitting substrate 16 through a drive signal line 44. In a case where the input third signal is at the low level, the drive circuit 42 generates a drive signal for turning off the LED lamp 46 provided in the light emitting substrate 16, and outputs the result to the light emitting substrate 16 through the drive signal line 44.

The LED lamp 46 provided in the light emitting substrate 16 is turned on and off according to the drive signal output from the drive circuit 42.

The control substrate 12 and the image reading substrate 14 are connected to each other by the cable 26, but if the distance between the control substrate 12 and the image reading substrate 14 is large, noise such as static electricity may easily influence during transmission of the first signal. As an example of the noise influence, there is a behavior that the signal of the low level is changed to the high level, or a behavior that the signal of the high level is changed to the low level. According to wiring and voltage application locations or the like, the latter behavior may easily occur, or the former behavior may easily occur. In the present exemplary embodiment, a case in which the former behavior easily occurs will be described as an example.

Hereinafter, a noise occurring while a signal is being transmitted to the image reading substrate 14 from the control substrate 12 is referred to as a noise 1, and the influence thereof will be described (see FIG. 1). In the present exemplary embodiment, it is assumed that the noise 1 occurs in the vicinity of the cable 26.

The first signal is a simple signal that is set to the high level when turning on the LED lamp 46 and is set to the low level when turning off the LED lamp 46, and is a signal that is generally used for control of turning on and off in the related art, but is easily influenced by the noise 1. In a case where only the first signal is used as the signal used for control of turning on and off of the LED lamp 46, if the first signal output as the low level signal is influenced by the noise 1 to be changed to the high level, false turning on in which the LED lamp 46 is turned on in a period when the LED lamp 46 is to be turned off cannot be avoided.

Thus, in the present exemplary embodiment, the reading control signal line 28 that is mainly used for controlling the CCD sensor 34 in the related art is also used for controlling turning on and off of the LED lamp 46 (accordingly, although not shown here, a transmission and reception circuit of serial data is also provided in each substrate of the image reading apparatus 10 in advance). Here, the distance between the first signal line 30 that transmits the first signal and the reading control signal line 28 that transmits the second serial data is a distance shorter than a predetermined distance in the portion of the cable 26 where the noise 1 may occur. However, a transmission type (type simply indicating the turning on and off by the low level and high level) of the first signal and a transmission type (type using the exemplified communication protocol) of the second serial data are different from each other. Thus, it is difficult for the second serial data to generate an error of changing the turning-on instruction to the turning-off instruction or changing the turning-off instruction to the turning-on instruction even though the noise 1 occurs during transmission. Accordingly, the influence of the noise 1 is small with respect to the second serial data, and most of the second serial data is normally received by the control circuit 32.

However, as described above, in the image reading substrate 14, in view of the arrangement of the CCD sensor 34, the control circuit 32 and the drive circuit 42 are separated from each other with the CCD sensor 34 being interposed therebetween. As the distance between the control circuit 32 and the drive circuit 42 is increased, the second signal may be influenced by a noise (hereinafter, referred to as a noise 2 for distinguishing the noise 1) such as static electricity during transmission.

Thus, in the present exemplary embodiment, in the control of turning on and off of the LED lamp 46, a drive signal is generated using a logical product (AND) of the first signal and the second signal. Accordingly, compared with the related art where the LED lamp 46 is controlled only by the first signal, it is possible to suppress false turning on and off of the LED lamp 46. Further, compared with a case where an erasing part is provided, it is possible to reduce the cost.

FIGS. 2A to 2E show an example of timing charts of respective signals. The CPU 20 generates and outputs the first signal at the high level (see FIG. 2A). Further, the CPU 20 generates and outputs the serial data (herein, the second serial data) for instruction of turning on at a specific time (see FIG. 2B). In FIGS. 2A to 2E, the second serial data for instruction of turning on is output before the first signal is switched to the high level. The control circuit 32 switches the second signal from the low level to the high level for output, according to the turning-on instruction of the second serial data (see FIG. 2C). The AND circuit 38 outputs the third signal at the high level, in a section where two inputs are at the high level (see FIG. 2D). The drive circuit 42 outputs the drive signal for turning on the LED lamp 46 (see FIG. 2E).

Then, the CPU 20 generates and outputs the first signal at the low level (see FIG. 2A), and generates and outputs the second serial data for instruction of turning off (see FIG. 28). The control circuit 32 switches the second signal from the high level to the low level for output, according to the turning-off instruction of the second serial data (see FIG. 2C). The AND circuit 38 outputs the third signal at the low level, in a section where at least one input is at the low level (see FIG. 2D), and the drive circuit 42 outputs the drive signal for turning off the LED lamp 46 (see FIG. 2E).

During the period when the LED lamp 46 is turned off, even though the first signal is influenced by the noise 1, the turning off state continues due to the second serial data. Further, even though the second signal is influenced by the noise 2, since it is rare that the timing when the first signal is influenced by the noise 1 and the timing when the second signal is influenced by the noise 2 completely coincide with each other, turning on of the LED lamp 46 is suppressed during the period when the LED lamp 46 is to be turned off.

FIGS. 2A to 2E show timing charts in a case where the period when the first signal is at the high level is shorter than the period when the second signal is at the high level (first signal has priority), but the period when the second signal is at the high level may be shorter than the period when the first signal is at the high level (second signal has priority). FIGS. 3A to 3E show timing charts of the latter case. In this case, false turning on in the turning off period is similarly suppressed.

FIGS. 2A to 2E and FIGS. 3A to 3E schematically show timings of respective signals, and it is assumed that a time difference from the time when the second serial data (turning-on instruction) is input to the control circuit 32 to the time when the second signal is switched to the high level, or a time difference from the time when the second serial data (turning-off instruction) is input to the control circuit 32 to the time when the second signal is switched to the low level is so short as to be ignored.

The CPU 20 may generate and output the first signal and the second serial data so that the difference between the timing when the low level of the first signal is changed to the high level and the timing when the second serial data for instruction of turning on is output is as small as possible (to be within a predetermined time). Further, the CPU 20 may generate and output the first signal and the second serial data so that the difference between the timing when the high level of the first signal is changed to the low level and the timing when the second serial data for instruction of turning off is output is as small as possible (to be in a predetermined time). As the difference between both the timings increases, the time of the noise influence increases. Thus, it is preferable that the difference between both the timings be as small as possible.

Hereinbefore, an example in which the serial data using SCIA is used for the turning on and off control of the LED lamp 46 has been described, but the transmission type is not particularly limiting if it is a transmission type that is not easily influenced by the noise 1.

Second Exemplary Embodiment

Figure 4:
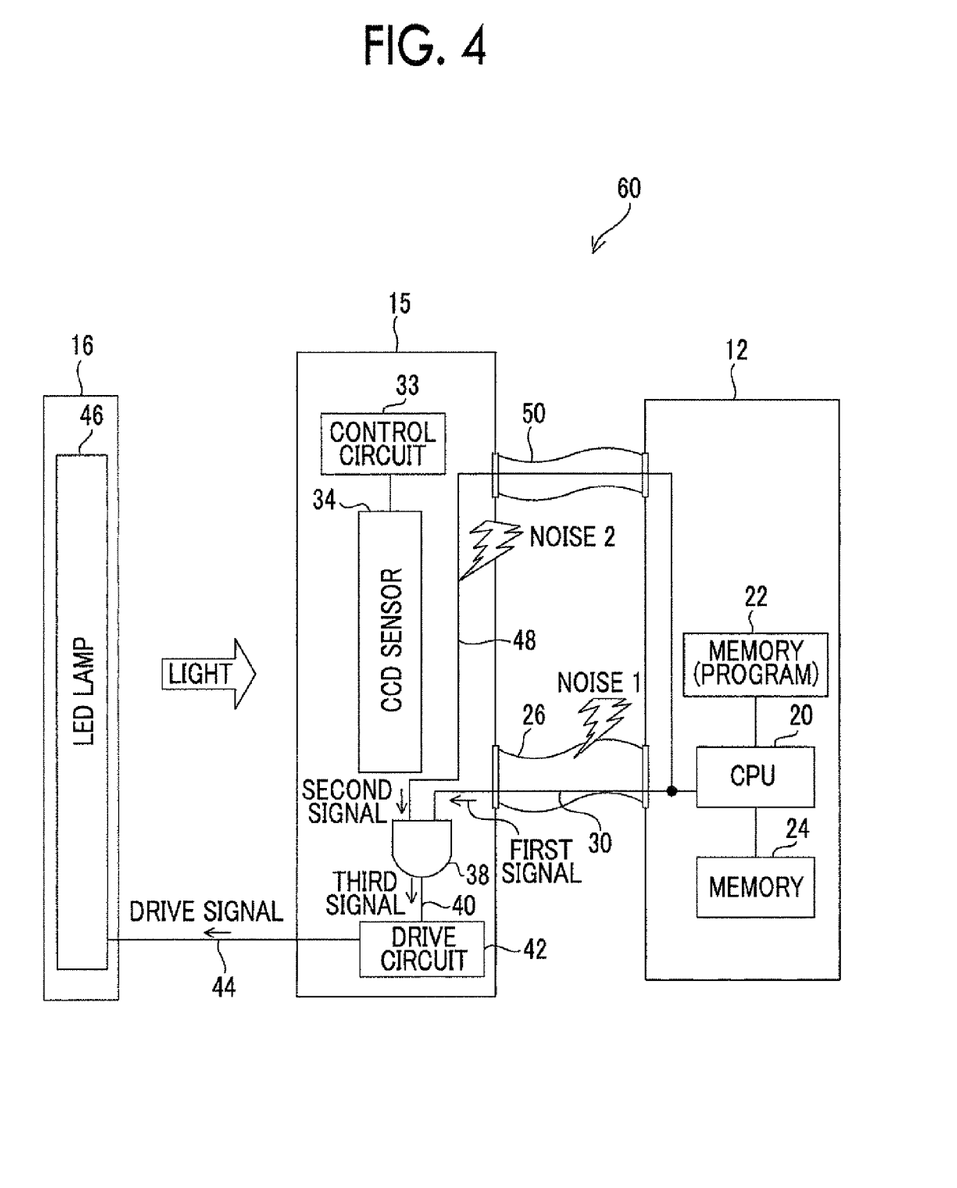
FIG. 4 is a diagram illustrating a configuration example of an image reading apparatus according to a second exemplary embodiment.

In a second exemplary embodiment, an example in which turning on and off of the LED lamp 46 is controlled using two control signals in which respective transmission paths have the same type and are separated from each other by a predetermined distance or more will be described.

The example of the influence of noise includes a behavior in which the low level signal is changed to the high level or a behavior in which the high level signal is changed to the low level. In the present exemplary embodiment, in a similar way to the first exemplary embodiment, a case where the former behavior easily occurs will be described as an example.

FIG. 4 is a diagram illustrating a configuration example of an image reading apparatus 60 according to the second exemplary embodiment. In FIG. 4, the same reference numerals are given to the same or equivalent units as in FIG. 1, and its description will be omitted.

The image reading apparatus 60 includes a control substrate 12, an image reading substrate 15 and a light emitting substrate 16. The control substrate 12 and the image reading substrate 15 in the present exemplary embodiment are connected to each other through a cable 26 and a cable 50.

A control circuit 33, a CCD sensor 34, an AND circuit 38 and a drive circuit 42 are provided in the image reading substrate 15. A configuration excluding the control circuit 33 is the same as that of the image reading substrate 14 in the first exemplary embodiment.

In a similar way to the first exemplary embodiment, a reading control signal line 28 is connected to the control circuit 33 in the second exemplary embodiment, and serial data (first serial data in the first exemplary embodiment) is input from the CPU 20 through the reading control signal line 28, but illustration of the reading control signal line 28 is omitted herein. In the present exemplary embodiment, second serial data is not generated and is not transmitted to the control circuit 33. Accordingly, here, a second signal is not generated and output in the control circuit 33.

Instead, in the present exemplary embodiment, a second signal line 48 that has one end connected to one of the input terminals of the AND circuit 38 and the other end connected to a branch point on a first signal line 30 and passes through the cable 50 is provided. The second signal line 48 is divided into a wiring portion in the control substrate 12, a wiring portion in the cable 50, and a wiring portion in the image reading substrate 15, but these wiring portions are referred to as the second signal line 48 for description without distinguishing the respective wiring portions. Further, the cable 50 is a cable that is not newly provided as an exclusive cable for turning on and off control of an LED lamp 46 but is originally provided for some use in the image reading apparatus 60. Further, although not shown herein, it is assumed that a transmission and reception circuit of a signal transmitted and received by the signal line passing through the cable 50 is provided in advance in the respective substrates of the image reading apparatus 60.

If the CPU 20 generates the first signal and outputs the first signal to the first signal line 30, the first signal is input to the second signal line 48 connected to the branch point on the first signal line 30. In the present exemplary embodiment, the first signal input to the second signal line 48 and transmitted to the AND circuit 38 is referred to as a second signal, and is described with being distinguished from the first signal transmitted to the AND circuit 38 through the first signal line 30.

Further, in the present exemplary embodiment, in the turning on and off control of the LED lamp 46, a drive signal is generated using a logical product (AND) of the first signal and the second signal branched from the first signal.

Hereinafter, a noise occurring in the vicinity of a transmission path of the first signal line 30 is referred to as a noise 1, and a noise occurring in the vicinity of a transmission path of the second signal line 48 is referred to as a noise 2. As shown in the figure, the cable 26 and the cable 50 are separated from each other by a predetermined distance or more (to such a degree that noise occurring in the vicinity of the cable 26 does not influence the signal line passing through the cable 50). Accordingly, the noise 1 occurring in the vicinity of the cable 26 barely influences the second signal that is transmitted through the second signal line 48. Further, on the contrary, even in a case where the noise 2 occurs in the vicinity of the cable 50, the noise 2 hardly influences the first signal that is transmitted on the transmission path separated from the cable 50.

Further, as shown in FIG. 4, in the image reading substrate 15, a portion to which the cable 50 is connected is separated from an input terminal of the AND circuit 38. If the distance between the portion to which the cable 50 is connected and the input terminal of the AND circuit 38 is long, in a similar way to the second signal line 36 in the first exemplary embodiment, the inside of the image reading substrate 15 may be influenced by the noise 2 such as static electricity during transmission. However, in the image reading substrate 15, the influence of the noise 2 is small with respect to the first signal line 30 in which the distance between the connection portion of the cable 26 and the input terminal of the AND circuit 38 is short.

Further, since it is rare that the timing when the first signal is influenced by the noise 1 and the timing when the second signal is influenced by the noise 2 completely coincide with each other, the LED lamp 46 is suppressed from being turned on during the period when the LED lamp 46 is to be turned off, compared with the related art where the LED lamp 46 is controlled only using the first signal. Further, compared with a case where an erasing part is provided, it is possible to reduce the cost.

Here, FIGS. 5A to 5D show an example of timing charts of respective signals according to the present exemplary embodiment. The first signal at the high level is output from the CPU 20 (see FIG. 5A). Further, the first signal branches at the branch point on the first signal line 30, and is transmitted to the second signal line 48 as the second signal (see FIG. 5B). The AND circuit 38 outputs the third signal at the high level when two inputs are at the high level (see FIG. 5C), and the drive circuit 42 outputs a drive signal for turning on the LED lamp 46 (see FIG. 5D).

Figure 5A:
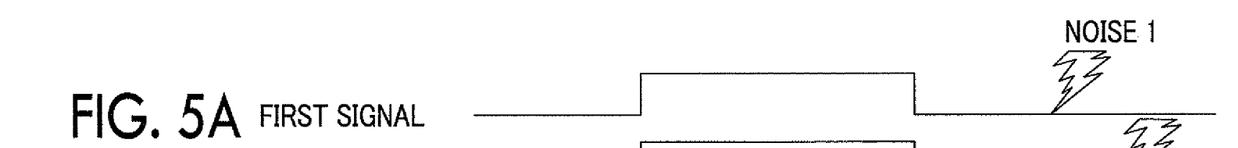
FIGS. 5A to 5D are diagrams illustrating an example of timing charts of respective signals according to the second exemplary embodiment.
Figure 5B:
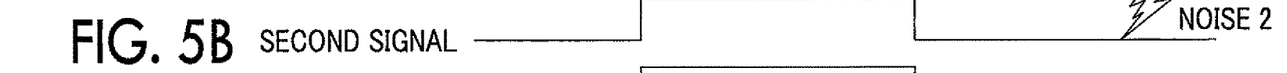
Figures 5C, 5D:
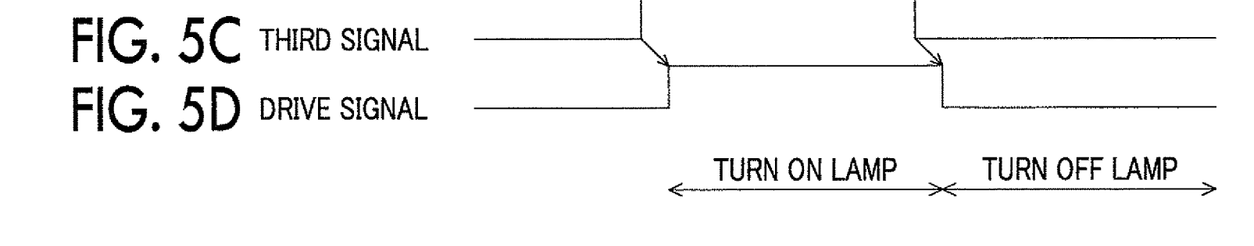

Thereafter, the first signal at the low level is generated and output by the CPU 20 (see FIG. 5A), and thus, the second signal is changed to the low level (see FIG. 5B). The AND circuit 38 outputs the third signal at the low level when at least one of two inputs is at the low level (see FIG. 5C), and the drive circuit 42 outputs a drive signal for turning off the LED lamp 46 (see FIG. 5D).

During the period when the LED lamp 46 is turned off, even though the first signal is influenced by the noise 1, the second signal is not influenced by the noise 1, and thus, the turning off state continues. Further, even though the second signal is influenced by the noise 2, since it is rare that the timing when the first signal is influenced by the noise 1 and the timing when the second signal is influenced by the noise 2 completely coincide with each other, the LED lamp 46 is suppressed from being turning on during the period when the LED lamp 46 is to be turned off.

In this way, in the present exemplary embodiment, one of the two transmission paths (here, the first signal line 30 and the second signal line 48) is disposed to be separated by a predetermined distance or more from a portion where the noise of the other transmission path can occur. Accordingly, false turning-on of the LED lamp 46 is suppressed.

The image reading apparatus is not limited to the configurations shown in the first exemplary embodiment and the second exemplary embodiment. For example, the image reading apparatus may be configured so that the characteristics of both of the first exemplary embodiment and the second exemplary embodiment are applied. Specifically, the image reading apparatus may be configured so that turning on and off of the LED lamp 46 is controlled using two control signals in which respective transmission types are different from each other and respective transmission paths are separated by a predetermined distance or more (as described above, it is sufficient if although not all transmission paths are separated by the predetermined distance or more, at least one of the transmission paths is separated from a portion where noise occurs on the other transmission path by the predetermined distance or more).

In the first and second exemplary embodiments, an example in which the light receiving unit employs the CCD sensor 34 has been described, but the light receiving unit may employ another solid-state imaging device, for example, a CMOS (Complementary Metal Oxide Semiconductor) sensor. Further, in the first and second exemplary embodiments, an example in which the light emitting unit is the LED lamp 46 has been described, but the light emitting unit may be configured by a different light emitting element such as an organic EL.

Further, in the first and second exemplary embodiments, an example in which when the first signal input to the AND circuit 38 is at the high level and the second signal input to the AND circuit 38 is at the high level, the LED lamp 46 is turned on, and when at least one of the first signal and the second signal input to the AND circuit 38 is at the low level, the LED lamp 46 is turned off, has been described, but the invention is not limited thereto. For example, a configuration in which when the first signal input to the AND circuit 38 is at the high level and the second signal input to the AND circuit 38 is at the high level, the LED lamp 46 is turned off, and when at least one of the first signal and the second signal input to the AND circuit 38 is at the low level, the LED lamp 46 is turned on, may be used (the pattern of high and low is reversed to the above-described exemplary embodiments).

Specifically, a program may be built so that the CPU 20 included in the first exemplary embodiment and the second exemplary embodiment generates and outputs the first signal at the low level in a case where the LED lamp 46 is turned on and generates and outputs the first signal at the high level in a case where the LED lamp 46 is turned off.

Further, in the first exemplary embodiment, the control circuit 32 is configured to operate as follows. The control circuit 32 generates and outputs the second signal at the low level in a case where the second serial data for instruction of turning on is input. Further, the control circuit 32 generates and outputs the second signal at the high level in a case where the second serial data for instruction of turning off is input to the control circuit 32.

The AND circuit 38 maintains its configuration as it is so as to operate the drive circuit 42 as follows. In a case where the third signal is at the high level, the drive circuit 42 generates and outputs the drive signal so that the LED lamp 46 is turned off, and in a case where the third signal is at the low level, the drive circuit 42 generates and outputs the drive signal so that the LED lamp 46 is turned on.

Alternatively, the drive circuit 42 may maintain its configuration as it is, and a NAND circuit instead of the AND circuit 38 may be provided. The first signal and the second signal are input to two input terminals of the NAND circuit, and an output thereof is a result obtained by performing NAND for the first signal and the second signal.

With such a configuration, in the case of an apparatus in which a behavior where a low-level signal becomes a high level easily occurs due to the influence of noise, false turning off is suppressed during the period when the LED lamp 46 is turned on.

Further, in the above description, the apparatus in which the behavior that the low-level signal becomes the high level easily occurs due to the influence of noise has been described as an example, but, conversely, in the case of an apparatus in which a behavior that a high-level signal becomes a low level easily occurs due to the influence of noise, the following configuration may be used.

For example, an OR circuit instead of the AND circuit 38 is provided. The OR circuit outputs a high-level third signal in a case where at least one of the first signal and the second signal is at the high level, and outputs a low-level third signal in a case where both of the first and second signals are at the low level. The drive circuit 42 generates and outputs a drive signal in a similar way to the first and second exemplary embodiments according to the third signal.

With such a configuration, in the case of the apparatus in which the behavior that the high-level signal becomes the low level easily occurs due to the influence of noise, false turning off is suppressed during the period when the LED lamp 46 is turned on.

Further, in a case where the OR circuit instead of the AND circuit 38 is provided, the drive circuit 42 may be configured to generate and output a drive signal so that the LED lamp 46 is turned off in a case where the third signal is at the high level, and generates and outputs a drive signal so that the LED lamp 46 is turned on in a case where the third signal is at the low level. In this case, when at least one of the first signal and the second signal input to the OR circuit is at the high level, the LED lamp 46 is turned off, and when the first signal and the second signal are at the low level, the LED lamp 46 is turned on. Thus, in the case of the apparatus in which the behavior that the high-level signal becomes the low level easily occurs due to the influence of noise, false turning on is suppressed during the period when the LED lamp 46 is turned off.

Further, in the above description, an example in which turning on and off of the LED lamp 46 is controlled using two control signals has been described, but turning on and off of the LED lamp 46 may be controlled using three or more control signals. In this case, for example, three or more input terminals are provided in the AND circuit 38 in the first and second exemplary embodiments. Further, for example, a configuration is used in which during the period when all the three or more control signals instruct the turning on, the third signal is output to turn on the LED lamp 46, and during the period when at least one of the three or more control signals instructs turning off, the third signal is output to turn off the LED lamp 46.

Alternatively, for example, a configuration may be used in which during the period when all the three or more control signals instruct turning off, the third signal is output to turn off the LED lamp 46, and during the period when at least one of the three or more control signals instructs turning on, the third signal is output to turn on the LED lamp 46.

In this way, in a case where three or more control signals are used, in a similar way to the above-described exemplary embodiments, the signals are output to satisfy at least one of the first condition that the respective transmission paths are separated from each other by the predetermined distance or more and the second condition that the respective transmission types are different from each other. Here, the first condition may be set to a condition that the arrangement positions of the respective transmission paths are separated from each other by a distance or more at which noise that influences at least one transmission path does not influence the other transmission path (s).

Further, in the configuration in which the OR circuit instead of the AND circuit 38 is provided, described in the above modified example, turning on and off of the LED lamp 46 may be controlled on the basis of three or more control signals.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading controller comprising:
    an output unit that outputs a plurality of control signals for controlling turning on and off of a light emitting unit of an image reading unit including the light emitting unit and a light receiving unit on respective transmission paths, the plurality of control signals satisfying a condition that respective transmission paths are separated from each other by a predetermined distance or more; and
    a controller that controls turning on and off of the light emitting unit on the basis of the plurality of control signals output from the output unit and input through the respective transmission paths.

2. The image reading controller according to claim 1, wherein the output unit outputs the plurality of control signals indicating the same control content in a predetermined time.

3. The image reading controller according to claim 1, wherein the controller controls a driving unit that drives the light emitting unit so that the light emitting unit is turned on in a case where the plurality of input control signals respectively instruct turning on of the light emitting unit, and controls the driving unit so that the light emitting unit is turned off in a case where at least one of the plurality of input control signals instructs turning off of the light emitting unit.

4. The image reading controller according to claim 2, wherein the controller controls a driving unit that drives the light emitting unit so that the light emitting unit is turned on in a case where the plurality of input control signals respectively instruct turning on of the light emitting unit, and controls the driving unit so that the light emitting unit is turned off in a case where at least one of the plurality of input control signals instructs turning off of the light emitting unit.

5. The image reading controller according to claim 1, wherein the controller controls a driving unit that drives the light emitting unit so that the light emitting unit is turned off in a case where the plurality of input control signals respectively instruct turning off of the light emitting unit, and controls the driving unit so that the light emitting unit is turned on in a case where at least one of the plurality of input control signals instructs turning on of the light emitting unit.

6. The image reading controller according to claim 2, wherein the controller controls a driving unit that drives the light emitting unit so that the light emitting unit is turned off in a case where the plurality of input control signals respectively instruct turning off of the light emitting unit, and controls the driving unit so that the light emitting unit is turned on in a case where at least one of the plurality of input control signals instructs turning on of the light emitting unit.

7. An image reading apparatus comprising:
an image reading unit that includes a light emitting unit and a light receiving unit;
a driving unit that drives the light emitting unit; and
the image reading controller according to claim 1.

8. An image reading apparatus comprising:
an image reading unit that includes a light emitting unit and a light receiving unit;
a driving unit that drives the light emitting unit; and
the image reading controller according to claim 2.

\* \* \* \* \*